US008663843B2

(12) United States Patent
Nakayama et al.

(10) Patent No.: US 8,663,843 B2
(45) Date of Patent: Mar. 4, 2014

(54) LITHIUM SECONDARY BATTERY (75) Inventors: Hideki Nakayama, Susono (JP);
Noritoshi Kasama, Fujisawa (JP)

(73) Assignee: Toyota Jidosha Kabushiki Kaisha, Toyota-shi, Aichi (JP)

( * ) Notice: Subject to any disclaimer, the term of this patent is extended or adjusted under 35 U.S.C. 154(b) by 191 days.

(21) Appl. No.: 13/148,347

(22) PCT Filed: Feb. 16, 2009

(86) PCT No.: PCT/JP2009/052527
§ 371 (c)(1),
(2), (4) Date: Aug. 8, 2011

(87) PCT Pub. No.: WO2010/092689
PCT Pub. Date: Aug. 19, 2010

(65) Prior Publication Data
US 2012/0021289 A1    Jan. 26, 2012

(51) Int. Cl.
*H01M 4/52* (2010.01)
*B05D 5/12* (2006.01)

(52) U.S. Cl.
USPC ............ 429/221; 429/231.5; 427/126.6

(58) Field of Classification Search
USPC ............ 429/221, 231.5; 427/126.1, 126.6
See application file for complete search history.

(56) References Cited

U.S. PATENT DOCUMENTS

| | | | |
|---|---|---|---|
| 6,979,516 B2 | 12/2005 | Kusumoto et al. | |
| 7,452,630 B2 * | 11/2008 | Thackeray et al. | 429/231.5 X |
| 7,815,888 B2 * | 10/2010 | Hatta et al. | 429/221 X |
| 8,034,485 B2 * | 10/2011 | Dahn et al. | 429/221 |
| 2004/0202605 A1 * | 10/2004 | Xu et al. | 429/221 X |
| 2005/0244711 A1 | 11/2005 | Fukui et al. | |
| 2007/0092797 A1 | 4/2007 | Konishiike et al. | |

FOREIGN PATENT DOCUMENTS

| | | |
|---|---|---|
| EP | 1 026 762 A1 | 8/2000 |
| JP | 62-219465 | 9/1987 |
| JP | 3-112070 | 5/1991 |
| JP | 8-130015 | 5/1996 |
| JP | 9-232002 | 9/1997 |
| JP | 11-111294 | 4/1999 |
| JP | 2000-228187 | 8/2000 |
| JP | 2002-110221 | 4/2002 |
| JP | 2002-298834 | 10/2002 |
| JP | 2003-217570 | 7/2003 |
| JP | 2003-257426 | 9/2003 |
| JP | 2007-26805 | 2/2007 |
| JP | 2007-122915 | 5/2007 |
| KR | 10-2005-0027224 | 3/2005 |

OTHER PUBLICATIONS

International Search Report in International Application No. PCT/JP2009/052527; Mailing Date: May 12, 2009.

* cited by examiner

*Primary Examiner* — Stephen J. Kalafut
(74) *Attorney, Agent, or Firm* — Finnegan, Henderson, Farabow, Garrett & Dunner, LLP (57) ABSTRACT

A lithium secondary battery (10) provided by the present invention has an iron oxide film-coated electrode employing a configuration in which an iron oxide film (144) capable of reversibly absorbing and desorbing lithium is retained on an electrically conductive base (142). The electrically conductive base (142) has a roughened surface having a surface roughness Rz of 3 μm or more, and the iron oxide film (144) is provided on the roughened surface.

8 Claims, 8 Drawing Sheets

LITHIUM SECONDARY BATTERY

CROSS-REFERENCE TO RELATED APPLICATIONS

This application is a national phase application of International Application No. PCT/JP2009/052527, filed Feb. 16, 2009, the contents of which are incorporated herein by reference.

TECHNICAL FIELD

The present invention relates to a lithium secondary battery that uses an iron oxide as an active material.

BACKGROUND ART

A lithium secondary battery (and typically, a lithium ion battery) is known that charges and discharges by migration of lithium ions between a positive electrode and a negative electrode. In a typical configuration employed by this type of lithium secondary battery, an electrode is provided that has a configuration in which a material capable of reversibly absorbing and desorbing lithium ions (active material) is retained on an electrically conductive member (current collector). At present, graphite is widely used as a negative electrode active material. In the case of graphite, however, since only one Li is intercalated per six carbon atoms, the charge-discharge capacity thereof has an upper limit of 372 mAh/g.

Therefore, various studies have been conducted on active materials expected to be able to realize a charge-discharge capacity greater than that of graphite. One example of such an active material is that having a composition that contains an iron oxide such as $Fe_2O_3$ (oxide containing iron as a constituent element). For example, Patent Document 1 describes a lithium secondary battery in which an iron oxide thin film, formed by depositing from a vapor phase or liquid phase onto a substrate, is used for the positive electrode active material. Examples of other technical documents relating to the use of iron oxide in a lithium secondary battery include Patent Documents 2 to 5.

Patent Document 1: Japanese Patent Application Laid-open No. 2002-298834
Patent Document 2: Japanese Patent Application Laid-open No. S62-219465
Patent Document 3: Japanese Patent Application Laid-open No. H11-111294
Patent Document 4: Japanese Patent Application Laid-open No. 2003-257426
Patent Document 5: Japanese Patent Application Laid-open No. H3-112070

DISCLOSURE OF THE INVENTION

However, iron-based oxides such as $Fe_2O_3$ normally have low charge-discharge reversibility and are known to be substances encounter difficulty when applying to secondary batteries (see, for example, paragraph 0006 of Patent Document 4). Therefore, an object of the present invention is to provide a lithium secondary battery, which is provided with an active material containing an iron oxide and demonstrates superior charge-discharge characteristics, and a production method thereof. Another related object of the present invention is to provide an electrode used to construct the lithium secondary battery.

The lithium secondary battery provided by the present invention is provided with a positive electrode, a negative electrode and a non-aqueous electrolyte, and one of the positive electrode and the negative electrode is an iron oxide film-coated electrode employing a configuration in which an iron oxide film capable of reversibly absorbing and desorbing lithium (Li) (and typically, an iron oxide film containing crystals of $\alpha$-$Fe_2O_3$) is retained on an electrically conductive base. Here, the electrically conductive base has a roughened surface having a surface roughness Rz of 3 μm or more, and the iron oxide film is provided on this roughened surface.

According to an electrode provided with this type of iron oxide film (active material film), a lithium secondary battery can be constructed in which charge-discharge reversibility is significantly improved in comparison with electrodes provided with a powdered iron oxide (such as an electrode obtained by forming an iron oxide powder into pellets together with an electrically conductive material and a binder). In addition, by providing the iron oxide film on a roughened surface having a value of Rz that is equal to or greater than a prescribed value, a lithium secondary battery can be constructed that has superior charge-discharge characteristics in comparison with an electrode employing a configuration in which an iron oxide film is provided on the surface of a typical metal film (smooth surface). For example, at least one of the effects consisting of high charge-discharge reversibility and large charge-discharge capacity per unit mass of an active material film (mass capacity density) can be realized.

In the present description, "lithium secondary battery" refers to a secondary battery that uses lithium ions as electrolyte ions and charges and discharges by movement of lithium ions between positive and negative electrodes. A secondary battery typically referred to as a lithium ion battery is a typical example of a secondary battery that is included in a lithium secondary battery as referred to in the present description.

The above-mentioned iron oxide film can be a film obtained by depositing an iron oxide on a roughened surface as described above. A vapor deposition method or a sputtering method and the like that uses iron oxide as a target, for example, can be preferably applied to this deposition. In a preferable aspect of the technology disclosed herein, the iron oxide film is a film obtained by depositing (and typically, by vapor deposition) an iron oxide on the roughened surface by oxygen ion beam assisted deposition. As a result of carrying out the oxygen ion beam assisted deposition, a film can be formed in which a crystals of iron oxide (and particularly, $\alpha$-$Fe_2O_3$ crystals) have grown to a greater extent. Thus, superior charge-discharge characteristics can be realized with a lithium secondary battery provided with this iron oxide film.

The technology disclosed herein can be preferably applied in an aspect in which the thickness TA of the iron oxide film is smaller than the Rz value of the roughened surface. According to this aspect, the surface morphology of the roughened surface can be reflected to a greater degree in the surface morphology of the iron oxide film. Thus, the surface area of the iron oxide film can be further increased. This increase in surface area facilitates the movement of material between the electrolyte and the iron oxide film and is able to contribute to improvement of efficiency and reversibility of the battery reaction, thereby making this preferable. In an example of a more preferable aspect, TA is smaller than the Rz value and TA is 5 μm or less. An iron oxide film having a small thickness in this manner makes it possible to realize even better charge-discharge characteristics.

An electrodeposited surface of electrolytic copper foil (outer surface during electrodeposition) can be preferably used for the roughened surface. An example of a preferable aspect of the technology disclosed herein is an aspect in which the base is electrolytic copper foil, and the iron oxide film is provided at least on an electrodeposited surface of the copper foil. Various electrolytic copper foils having different values of Rz for the electrodeposited surface are available commercially (and may also be those in which the electrodeposited surface is further roughened). In addition, an electrolytic copper foil having a desired value of Rz is also easily fabricated. Thus, an electrolytic copper foil having a preferable Rz as disclosed herein can be easily acquired (purchased or manufactured), and an electrode can be easily produced using that copper foil. Since long electrolytic copper foil of this type can be easily acquired, this electrolytic copper foil is also suitable for use as a constituent of a battery provided with an electrode body of a form in which a long sheet-like positive electrode and negative electrode are superimposed and wound (wound-type electrode body).

Both a lithium secondary battery in which the iron oxide film-coated electrode is provided as a negative electrode and a lithium secondary battery in which the iron oxide film-coated electrode is provided as a positive electrode are included in the technology disclosed herein. A lithium secondary battery in which the iron oxide film-coated electrode is provided as a negative electrode is more preferable. This aspect is suited to providing a battery having a higher working voltage. In addition, this is also preferable since the active material of the counter electrode can be selected over a wider range.

A lithium secondary battery in which an iron oxide film-coated electrode, which employs a configuration in which an iron oxide film capable of reversibly absorbing and desorbing Li is retained on an electrically conductive base, is provided as a negative electrode is included in the technology disclosed herein. The iron oxide film can be a film obtained by depositing iron oxide on the surface of the base by oxygen ion beam assisted deposition (and typically, a film containing $\alpha$-$Fe_2O_3$ crystals).

A method of producing an electrode for a lithium secondary battery is also provided by the present invention. The production method includes the preparation of an electrically conductive base having a roughened surface in which surface roughness Rz is 3 μm or more. In addition, the production method also includes the formation of an iron oxide film by depositing an iron oxide on the roughened surface of the base. This method can be preferably applied to the production of any of the iron oxide film-coated electrodes disclosed herein. Oxygen ion beam assisted deposition can be preferably employed for depositing the iron oxide (and typically, by vapor deposition).

According to the present invention, a lithium secondary battery production method is also provided that comprises the construction of a battery using any of the electrodes disclosed herein (which can be electrodes produced according to any of the methods disclosed herein). This method can be preferably applied to the production of any of the lithium secondary batteries disclosed herein.

Since the lithium secondary battery (and typically, a lithium ion battery) disclosed herein can have superior charge-discharge characteristics as previously described, it is preferable for use as a lithium secondary battery installed in a vehicle. For example, the lithium secondary battery disclosed herein can be preferably used as a power source for the motor of a vehicle such as an automobile in the form of an assembled battery in which a plurality of the lithium secondary batteries are connected in series. Thus, according to the present invention, a vehicle is provided that is provided with any of the lithium secondary batteries disclosed herein (which can be lithium secondary batteries produced according to any of the methods disclosed herein).

BEST MODE FOR CARRYING OUT THE INVENTION

The following provides an explanation of preferred embodiments of the present invention. Matters required for carrying out the present invention that are not specifically mentioned in the present description can be understood to be design matters for a person with ordinary skill in the art based on the prior art in the relevant field. The present invention can be carried out based on the contents disclosed in the present description and common general technical knowledge in the relevant field.

An electrically conductive member having the same material and form of a current collector of a typical lithium secondary battery can be used for the electrically conductive base in the technology disclosed herein. For example, a rod, plate, sheet (foil) or mesh and the like composed mainly of an electrically conductive material (and typically, a metal material) such as copper, aluminum, nickel, titanium or stainless steel can be used. A sheet-like electrically conductive base (and typically, a metal foil) can be preferably employed since it facilitates formation of an iron oxide film by vapor deposition and the like to be subsequently described and can be easily applied to a high-capacity battery. Although there are no particular limitations on the thickness of the sheet-like base, in consideration of the balance between capacity density of the battery and strength of the base, the thickness is preferably within the range of 5 μm to 200 μm (and more preferably within the range of 10 μm to 50 μm).

In a typical aspect of the technology disclosed herein, at least a portion of the range of the surface of the electrically conductive base has a surface roughness Rz of 3 μm or more (and preferably 4 μm or more). An iron oxide film (active material film) is provided on this roughened surface. As a result, a lithium secondary battery can be realized that demonstrates higher charge-discharge characteristics than a configuration in which an iron oxide film is provided on the surface of a typical metal foil (typically having an Rz of less than 1 μm). In addition, an iron oxide film provided on a roughened surface in this manner demonstrates more favorable adhesion (anchoring effects) with the base than an iron oxide provided on a smoother surface (namely, a surface having a smaller Rz value). This is preferable from the viewpoints of handling and durability of an iron oxide film-coated electrode. In addition, by forming an iron oxide film on this roughened surface, specific surface area increases, thereby making it possible to increase the reaction surface area. This increase in reaction surface area is advantageous in terms of efficiently carrying out the battery reaction.

Note that the "surface roughness Rz" referred to here refers to ten-point average roughness as defined in JIS B 0601 (1994). Although there are no particular limitations on the upper limit of Rz, generally the upper limit is preferably 50 μm or less (for example, 20 μm or less) from the viewpoints of facilitating the formation of an iron oxide film that follows the morphology of the roughened surface.

The roughened surface may be substantially the entire surface of the electrically conductive base (for example, nearly the entire range of both sides of a sheet-like base) or a partial range thereof (for example, nearly the entire range of one side of a sheet-like base, a range that leaves in the form of a band portion that lies along one side of the base on one side thereof, or a range that leaves in the form of a band a portion that lies along one side of the base on both sides thereof). An electrically conductive base in which substantially the entire surface is a roughened surface offers the advantage of allowing the formation of an iron oxide film of a wider range of the base. In addition, a sheet-like base in which nearly the entire range of one side is a roughened surface (for example, an electrolytic copper foil having an electrodeposited surface that satisfies the above-mentioned value for Rz) is advantageous in terms of cost since it can be easily produced or acquired. In the case only a portion of the surface of the electrically conductive base is in the form of a roughened surface, the iron oxide film may be formed only on the roughened surface or a portion of the iron oxide film may be formed at a portion other than the roughened surface. Typically, substantially all of the iron oxide film is formed on the roughened surface.

The upper limit of the preferable range of Rz differs according to the shape of the base and the formation site on the roughened surface. From the viewpoint of ensuring suitable base strength, the thickness of a portion not involved in the formation of surface irregularities in the roughened surface (base portion) at the site on the base where the roughened surface is present is preferably 3 μm or more (more preferably 5 μm or more, and for example, 7 μm or more). For example, in a sheet-like base having a total thickness of 18 μm, in a configuration in which the roughened surface constitutes nearly the entire range on both sides (namely, the entire surface thereof), the total Rz of both sides is preferably 6 μm to 15 μm (namely, the thickness of the base portion is 3 μm to 12 μm), and the total Rz of both sides is more preferably 6 μm to 10 μm (for example, the Rz values of one side and the other side are both 3 μm to 5 μm). In addition, in a similar sheet-like base having a total thickness of 18 μm, in a configuration in which the roughened surface constitutes nearly the entire range on one side thereof, the Rz of the roughened surface is preferably 15 μm or less and more preferably 10 μm or less (for example, about 3 μm to 8 μm).

An electrolytic copper foil is an example of a preferable electrically conductive base for the technology disclosed herein. Normally, the electrodeposited surface (outer surface during electrodeposition) of an electrolytic copper foil has a larger surface roughness Rz than the back surface. An electrolytic copper foil in which Rz of the electrodeposited surface thereof is within the preferable range described above can be preferably employed as an electrically conductive base. The copper foil may also be an electrolytic copper foil for which Rz had been adjusted by carrying out surface roughening treatment following electrodeposition. For example, an electrolytic copper foil can be preferably used in which the thickness is about 10 μm to 50 μm and Rz is 3 μm to 15 μm (provided that the thickness of the base portion is 5 μm or more).

Another example of an electrically conductive base is a base obtained by forming a roughened surface having an Rz of 3 μm or more by carrying chemical treatment such as etching, physical treatment such as filing or treatment consisting of a combination thereof over at least a partial range of the surface of a metal member. For example, a sheet-like base can be obtained in which both sides are roughened surfaces by carrying out this type of surface roughening treatment on the back side of an electrolytic copper foil.

An electrode in the technology disclosed herein is characterized in that an iron oxide film provided on the roughened surface described above. Here, an iron oxide film refers to a film mainly composed of an iron oxide (such as $Fe_2O_3$, $Fe_3O_4$ or FeO), and includes films intentionally containing an element other than iron and oxygen as an accessory component. In a preferable aspect, the iron oxide film is a film that does not substantially contain elements other than iron and oxygen (and refers to at least not intentionally containing those elements, while allowing elements other than oxygen and iron to be unintentionally or unavoidably contained). Note that the composition of the iron oxide film referred to here refers to the composition prior to the iron oxide film being used in a battery reaction (prior to initial absorption of Li).

The iron oxide film preferably at least contains $\alpha$-$Fe_2O_3$ crystals. The presence of $\alpha$-$Fe_2O_3$ crystals can be confirmed by ordinary measurement of X-ray diffraction (XRD). An iron oxide film that exhibits a high diffraction intensity derived from $Fe_2O_3$ in the XRD spectrum thereof is preferable. Such an iron oxide film enables the realization of a battery that demonstrates more favorable charge-discharge characteristics.

Various types of conventionally known deposition methods, such as plating or vapor deposition, can be used alone or in a suitable combination for the method used to form the iron oxide film on the roughened surface. Among these methods, vapor deposition can be used preferably. The concept of vapor deposition as referred to here includes various types of vapor deposition methods such as physical vapor deposition (PVD, e.g. sputtering), chemical vapor deposition (CVD, e.g. plasma CVD) or reactive vapor deposition. Formation of an iron oxide film by this vapor deposition is typically carried out under reduced pressure conditions (for example, at a pressure of $10^{-3}$ Pa to $10^{-5}$ Pa, or in other words, vacuum vapor deposition).

In a preferable aspect of the technology disclosed herein, an iron oxide film is formed by vapor deposition using a target (vapor deposition source) containing iron oxide. A target composed mainly of iron oxide (and typically, $Fe_2O_3$) can be preferably used for the target. Normally, a preferable iron oxide can be formed by using a target substantially composed of iron oxide. For example, granular $Fe_2O_3$ having a mean particle diameter of about 0.5 mm to 20 mm (preferably, 1 mm to 10 mm, and for example, 2 mm to 5 mm) can be used. Methods consisting of heating by radiating various types of high energy beams, such as an electron beam, ion beam or laser, can be preferably used to vaporize the target. Alternatively, a heating method such as resistance heating or induction heating may also be used.

A method consisting of forming a vapor deposited film by radiating an electron beam onto a target under reduced pressure conditions (electron beam vapor deposition) can be preferably used to form an iron oxide film in the technology disclosed herein. This electron beam vapor deposition can be preferably carried out using an ordinary vacuum vapor deposition system. Although there are no particular limitations thereon, the pressure during vapor deposition can be, for example, about $10^{-3}$ Pa to $10^{-5}$ Pa. In addition, radiation of the electron beam can be carried out at an output of about, for example, 500 W to 1000 W using an ordinary electron gun.

Deposition of the iron oxide can be carried out while radiating an ion beam onto the deposited surface (namely, the surface on which the iron oxide film is to be formed). Radiation of an oxygen ion beam is particularly preferable (or in other words, oxygen ion beam assisted deposition). Carrying out this oxygen ion beam assisted deposition makes it possible to effectively promote the growth of iron oxide crystals (for example, $\alpha$-$Fe_2O_3$ crystals). As a result, an iron oxide film can be formed that is capable of realizing superior charge-discharge performance.

If the thickness TA of the iron oxide film is excessively large, it becomes difficult to adequately demonstrate effects that improve charge-discharge characteristics, and there may be cases in which the iron oxide film easily separates from the base accompanying repeated charging and discharging. In addition, if the thickness TA is excessively small, the proportion of the electrode volume occupied by the iron oxide film (active material film) becomes small, thereby tending to lower the capacity energy density of the battery. From these viewpoints, normally the thickness TA of the iron oxide film is suitably about 0.1 µm to 30 µm, and preferably within the range of about 0.2 µm to 10 µm (and for example, about 0.5 µm to 5 µm).

The relationship between the thickness TA of the iron oxide film and the surface roughness Rz of the roughened surface is preferably such that TA<Rz. According to this aspect, the surface morphology of the base of the iron oxide film (namely, the roughened surface) can be more closely reflected in the surface morphology of the iron oxide film. Thus, the surface of the iron oxide film can be further increased. This increase in surface area facilitates the movement of material between the electrolyte and the iron oxide film and is able to contribute to improvement of efficiency and reversibility of the battery reaction, thereby making this preferable.

In a preferable aspect, the thickness TA of the iron oxide film is roughly 5 µm or less (for example, roughly 0.5 µm to 5 µm). An iron oxide film of this thickness enables the realization of particularly favorable charge-discharge characteristics. An iron oxide film having a thickness TA of 3 µm or less (and for example, roughly 1 µm to 3 µm) is more preferable.

In carrying out the technology disclosed herein, although it is not necessary to clarify the reason why charge-discharge characteristics are further improved by making TA to be the thickness described above, a possible reason for this is described below. Namely, $Fe_2O_3$, which is a typical iron oxide in the technology disclosed herein, is able to absorb Li according to reaction formula (1) indicated below (theoretical capacity: 1008 mAh/g).

$$Fe_2O_3 + 6Li \rightarrow 3Li_2O + 2Fe \quad (1)$$

Li is desorbed by the reverse reaction (reaction proceeding to the left) of that indicated in formula (1) above. Here, in order to allow the reverse reaction to easily proceed reversibly, it is advantageous to finely disperse the $Li_2O$ formed by the reaction that proceeds to the right (namely, absorption of Li). In other words, aggregate $Li_2O$ has difficulty in desorbing Li, and the Li that is not desorbed corresponds to irreversible capacity that lowers the charge-discharge characteristics (such as charge-discharge efficiency or capacity retention rate) of the battery. If the thickness TA of the iron oxide film is small, it becomes easy for the $Li_2O$ formed by absorption of Li to be widely dispersed (namely, becomes resistant to the formation of aggregates that impair reversibility), and this is thought to contribute to improvement of charge-discharge reversibility.

The thickness TA of the iron oxide film (which refers to the thickness that follows the irregular morphology of the roughened surface) can be determined by observing a cross-section of the base on which the film is formed with a scanning electron microscope (SEM). Alternatively, the thickness TA of the iron oxide film may also be calculated from a weight change in the electrically conductive base before and after forming the iron oxide film, the base surface area over the range where the iron oxide film is formed (which can be measured with, for example, a laser microscope), and the density of the iron oxide film.

Although the following provides an explanation of an example of the configuration of a lithium ion battery, which uses an electrode having the previously described iron oxide film as a negative electrode, as a preferable example of a lithium secondary battery according to the present invention, embodiments of the present invention are not intended to be limited thereto.

The lithium ion battery disclosed herein is characterized by being provided with the above-mentioned iron oxide film-coated electrode as a negative electrode. Thus, there are no particular limitations on the contents, materials or compositions of other battery constituent materials and members provided the object of the present invention can be realized, and that similar to a conventional lithium ion battery can be used.

For example, a positive electrode, of a form in which an active material capable of reversibly absorbing and desorbing Li is adhered to a current collector as a positive electrode mixture together with a binder and electrically conductive material and the like used as necessary, can be preferably used as a positive electrode. A rod, plate, sheet, foil or mesh and the like mainly composed of aluminum, nickel, titanium or stainless steel and the like can be used for the positive electrode current collector. An oxide-based active material having a laminated structure or an oxide-based active material having a spinel structure, which is used in a positive electrode of a typical lithium ion battery, can be preferably used for the above-mentioned active material (positive electrode active material). Typical examples of this active material include lithium transition metal oxides such as lithium cobalt oxide, lithium nickel oxide or lithium manganese oxide. Examples of electrically conductive materials include carbon materials such as carbon black (e.g. acetylene black) or graphite powder, and electrically conductive metal powders such as nickel powder. Examples of binders include polyvinylidene fluoride (PVDF), polytetrafluoroethylene (PTFE), carboxymethyl cellulose (CMC) and styrene-butadiene rubber (SBR).

Although there are no particular limitations thereon, the amount of the electrically conductive material used per 100 parts by weight of the positive electrode active material can be, for example, 1 part by weight to 20 parts by weight (and preferably, 5 parts by weight to 15 parts by weight). In addition, the amount of the binder used per 100 parts by weight of the positive electrode active material can be, for example, 0.5 parts by weight to 10 parts by weight.

A liquid electrolyte containing a non-aqueous solvent and a lithium salt able to dissolve in the solvent (supporting electrolyte) is preferably used for the electrolyte interposed between the positive electrode and the negative electrode. The electrolyte may also be a solid (gelled) electrolyte in which a polymer is added to the liquid electrolyte. Examples of the non-aqueous solvent that can be used include aprotic solvents such as carbonates, esters, ethers, nitriles, sulfones or lactones. For example, one type or two or more types of non-aqueous solvents can be used that are selected from non-aqueous solvents known to be able to be commonly used in electrolytes of lithium ion batteries, such as ethylene carbonate (EC), propylene carbonate (PC), diethyl carbonate (DEC), dimethyl carbonate (DMC), ethyl methyl carbonate (EMC), 1,2-dimethoxyethane, 1,2-diethoxyethane, tetrahydrofuran, 2-methyltetrahydrofuran, dioxane, 1,3-dioxolane, diethylene glycol dimethyl ether, ethylene glycol dimethyl ether, acetonitrile, propionitrile, nitromethane, N,N-dimethylformamide, dimethylsulfoxide, sulfolane or γ-butyrolactone.

Examples of the supporting electrolyte that can be used include one type or two or more types of lithium salts selected from various types of lithium salts known to be able to function as supporting electrolytes in electrolytic solutions of lithium ion batteries, such as $LiPF_6$, $LiBF_4$, $LiN(SO_2CF_3)_2$, $LiN(SO_2C_2F_5)_2$, $LiCF_3SO_3$, $LiC_4F_9SO_3$, $LiC(SO_2CF_3)_3$ or $LiClO_4$. There are no particular limitations on the concentration of the supporting electrolyte (supporting salt), and can be the same as that of the electrolyte used in a conventional lithium ion battery. Normally, a non-aqueous electrolyte can be preferably used that contains the supporting electrolyte at a concentration of about 0.1 mol/L to 5 mol/L (and for example, about 0.8 mol/L to 1.5 mol/L).

A lithium ion battery is constructed by placing the positive electrode and the negative electrode in a suitable container (such as a case made of metal or plastic or a pouch composed of a laminated film) together with the electrolyte. In a typical configuration of the lithium ion battery disclosed herein, a separator is interposed between the positive electrode and the negative electrode. A separator similar to that used in an ordinary lithium ion battery can be used for the separator, and there are no particular limitations thereon. For example, a porous sheet or non-woven fabric made of a resin material such as polyethylene (PE), polypropylene (PP), polyester, cellulose or polyamide can be used. In a lithium ion battery that uses a solid electrolyte, a configuration may be employed in which the electrolyte also serves as a separator. There are no particular limitations on the shape of the lithium ion battery (shape of the container), and can be, for example, a cylindrical, prismatic or coin battery.

Figure 10:
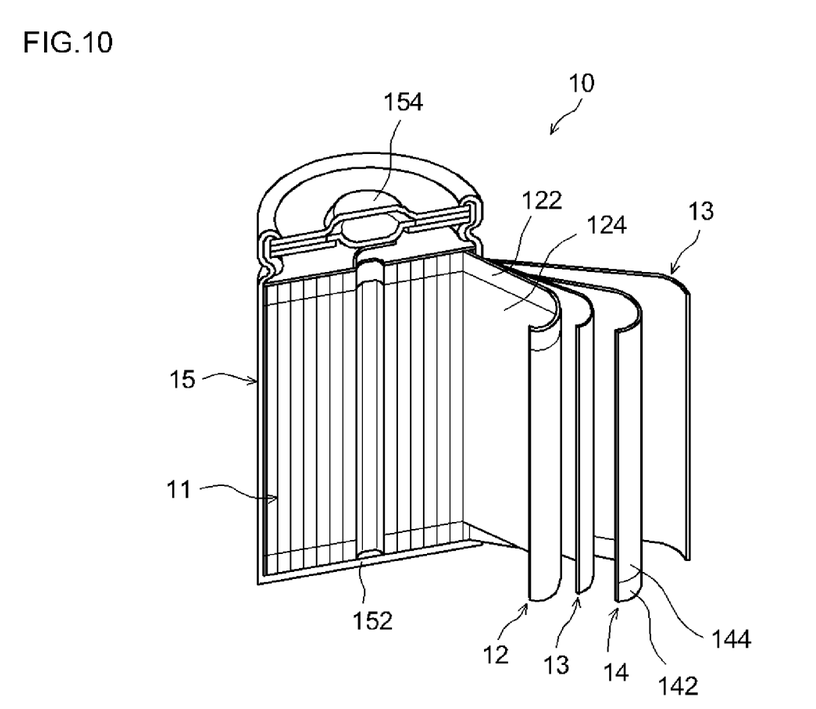
FIG. 10 is a longitudinal cross-sectional view showing an example of the configuration of a lithium secondary battery according to the present invention.

An example of the configuration of a lithium ion battery provided by the present invention is shown in FIG. 10. This lithium ion battery 10 has a configuration in which an electrode body 11 provided with a positive electrode 12 and a negative electrode 14 is housed in a battery case 15 of shape that is able to house the electrode body together with a non-aqueous electrolyte solution not shown.

The electrode body 11 is formed by winding the positive electrode 12, which has a positive electrode mixture layer 124 on a positive electrode current collector 122 in the form of a long sheet, and the negative electrode 14, which has a configuration in which an iron oxide film (active material layer) 144 of a prescribed thickness is provided on a roughened surface of a negative electrode current collector (for example, an electrolytic copper foil) 142 in the form of a long sheet, together with two separators 13 in the form of long sheets. The battery case 15 is provided with a bottomed cylindrical case body 152 and a lid 154 that covers the opening. Both the lid 154 and the case body 152 are made of metal, are mutually insulated, and are electrically connected to the current collectors 122 and 142 of the positive and negative electrodes, respectively. Namely, in this lithium ion battery 10, the lid 154 also serves as a positive electrode terminal, while the case body 152 also serves as a negative electrode terminal.

In the case of using the iron oxide film-coated electrode disclosed herein as a positive electrode of a lithium secondary battery, a material such as graphite, Sn alloy or Si alloy can be used for the negative electrode active material.

Although the following provides an explanation of examples relating to the present invention, the present invention is not intended to be limited to these specific examples.

Example 1

An iron oxide was deposited on an electrodeposited surface (outer surface during electrodeposition, Rz=5.0 μm) of an electrolytic copper foil having a thickness of 18 μm (Mitsui Mining and Smelting, trade name: "3EC-III") to produce an electrode. Namely, the electrolytic copper foil was placed in the chamber of a vapor deposition system (Shincron, Model "BSC-700") provided with an electron gun (JEOL, trade name: "102UO") and an ion beam source (Veeco, trade name: "Mark II"), followed by cleaning by radiating an ion beam for 5 minutes onto the roughened surface under conditions of 90 V and 0.8 A.

Next, pressure inside the chamber was reduced to $1.3 \times 10^{-5}$ Torr (approx. $1.7 \times 10^{-3}$ Pa), and $Fe_2O_3$ particles (vapor deposition source) having a particle diameter of 2 mm to 5 mm were evaporated by irradiating with an electron beam while radiating an oxygen ion beam onto the vapor-deposited surface from the ion beam source to deposit onto the roughened surface of the electrolytic copper foil and form an iron oxide film (active material film) having a thickness of about 2 μm. The oxygen ion beam was radiated under conditions of 90 V and 0.8 A at an oxygen gas ($O_2$) flow rate of about 5 SCCM. The electron beam was radiated under conditions of 6 kV and 130 mA. The deposition rate was about 1 μm/minute. In this manner, an electrode was produced having an iron oxide film having a thickness of about 2 μm on a copper foil surface having an Rz value of 5.0 μm. The thickness of the iron oxide film was determined by measuring the surface area of the vapor-deposited surface using a laser microscope prior to forming the iron oxide film, and then calculating the thickness from this surface area, the change in weight of the electrolytic copper foil before and after vapor deposition, and the density of the iron oxide film. In addition, a test electrode obtained by stamping out this electrode into the shape of a circle having a diameter of about 16 mm (and containing about 12 mg of the iron oxide film) was used in performance evaluation to be subsequently described.

Example 2

In this example, the same electrolytic copper foil as Example 1 was used, but the vapor-deposited surface was the opposite that of Example 1 (inner surface during electrodeposition, Rz=0.3 μm). An electrode was then produced in the same manner as Example 1 having an iron oxide film (active material film) having a thickness of about 2 μm on a copper foil surface having an Rz value of 0.3 μm. A test electrode obtained by stamping out this electrode into the shape of a circle having a diameter of about 16 mm (and containing about 2 mg of the iron oxide film) was used in performance evaluation to be subsequently described.

Example 3

A commercially available $Fe_2O_3$ powdered material (Kojundo Chemical Laboratory, mean particle diameter: 1 μm) and acetylene black serving as an electrically conductive material were so that the weight ratio of these materials was 85:15. This mixture was then press-molded on a copper mesh base material to produce a pellet-shaped electrode having a diameter of about 16 mm and a thickness (including the base material) of about 0.5 mm. This pellet-shaped electrode (containing about 15 mg of the $Fe_2O_3$ powdered material) was used as a test electrode in performance evaluation to be subsequently described.

<Performance Evaluation>

Figure 11:
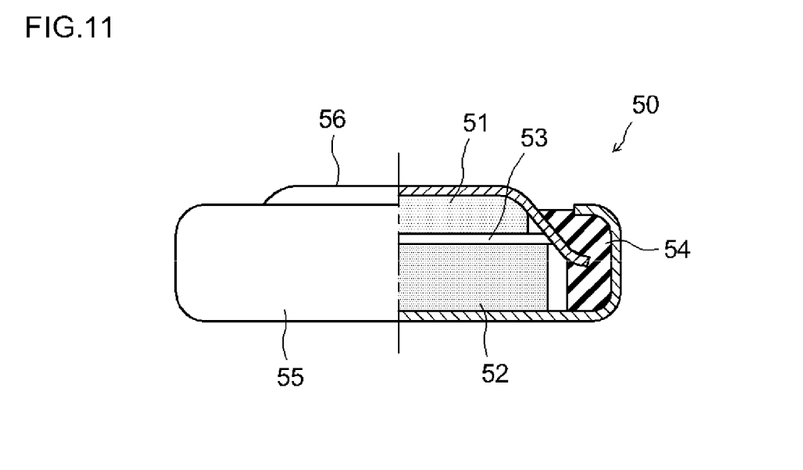
FIG. 11 is a partial cross-sectional view schematically showing a coin cell produced for evaluation of performance.

The test electrode (working electrode) according to each example, metal lithium serving as a counter electrode (using metal Li foil having a diameter of 19 mm and thickness of 0.15 mm), a separator (using a porous polyolefin sheet having a diameter of 22 mm and thickness of 0.02 mm) and an electrolyte were incorporated in a stainless steel container to construct a coin cell 50 shown in FIG. 11 (half cell for evaluation of charge-discharge performance) having a thickness of 2 mm and diameter of 32 mm (type 2032). In FIG. 11, reference symbol 51 indicates the working electrode (test electrode), reference symbol 52 indicates the counter electrode, reference symbol 53 indicates the separator immersed in electrolytic solution, reference symbol 54 indicates a gasket, reference symbol 55 indicates the container (counter electrode terminal) and reference symbol 56 indicates the lid (working electrode terminal). A mixed solvent of ethylene carbonate (EC), dimethyl carbonate (DMC) and ethyl methyl carbonate (EMC) at a volume ratio of 3:3:4 was used for the electrolytic solution, while $LiPF_6$ dissolved at a concentration of about 1 mol/L was used as a supporting salt.

Figure 6:
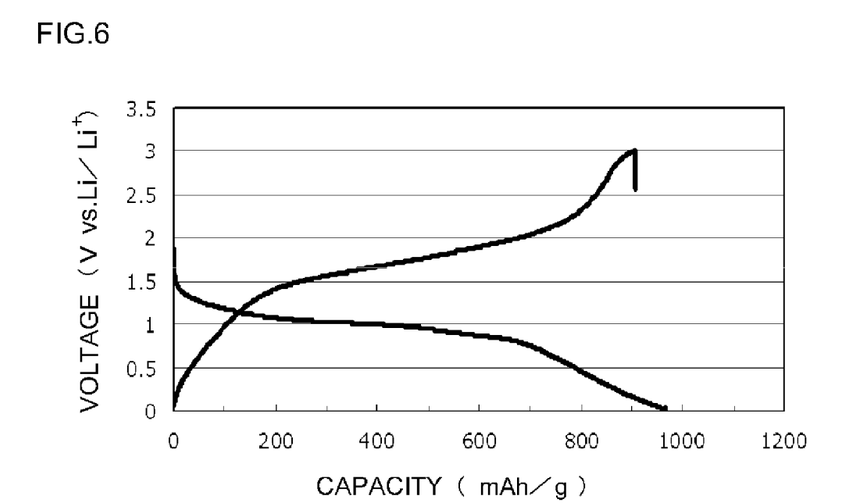
FIG. 6 is a voltage chart showing the charge-discharge characteristics of an electrode according to Example 1.
Figure 7:
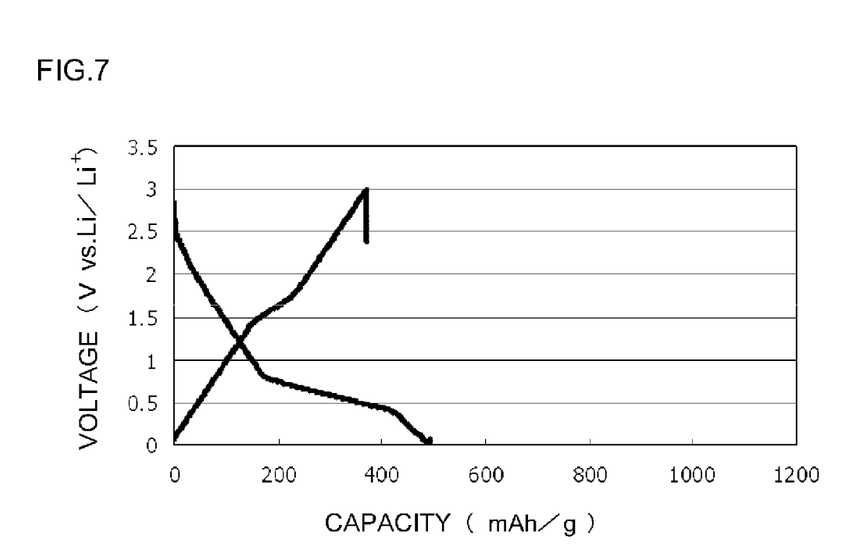
FIG. 7 is a voltage chart showing the charge-discharge characteristics of an electrode according to Example 2.
Figure 8:
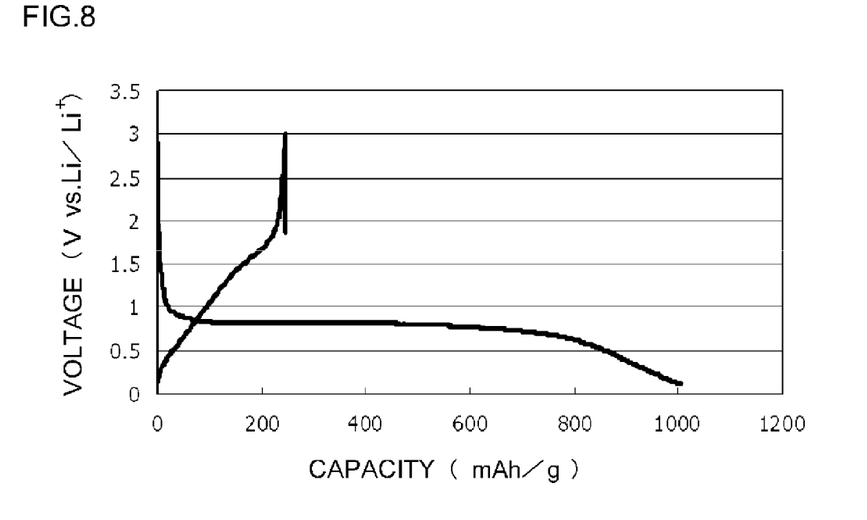
FIG. 8 is a voltage chart showing the charge-discharge characteristics of an electrode according to Example 3.

A procedure (discharging) was carried out on each coin cell in which Li was absorbed on the test electrode until an inter-electrode voltage at a constant current of 0.1 C reached 0.01 V (lower limit voltage), after which a procedure (charging) was carried out in which Li was desorbed until the inter-electrode voltage at a constant current of 0.1 C reached 3.0 V (upper limit voltage). Initial charge-discharge efficiency was calculated from the ratio of Li absorption capacity to Li desorption capacity during this initial charging and discharging. The results are shown in Table 1. In addition, the initial charge-discharge curves according to each example are shown in FIGS. 6 to 8.

TABLE 1

| | Li absorption capacity (mAh/g) | Li desorption capacity (mAh/g) | Efficiency (%) | Comments |
|---|---|---|---|---|
| Example 1 | 967 | 905 | 93.6 | Rz = 5.0 |
| Example 2 | 494 | 370 | 74.9 | Rz = 0.3 |
| Example 3 | 1053 | 247 | 23.4 | $Fe_2O_3$ powder |

Figure 9:
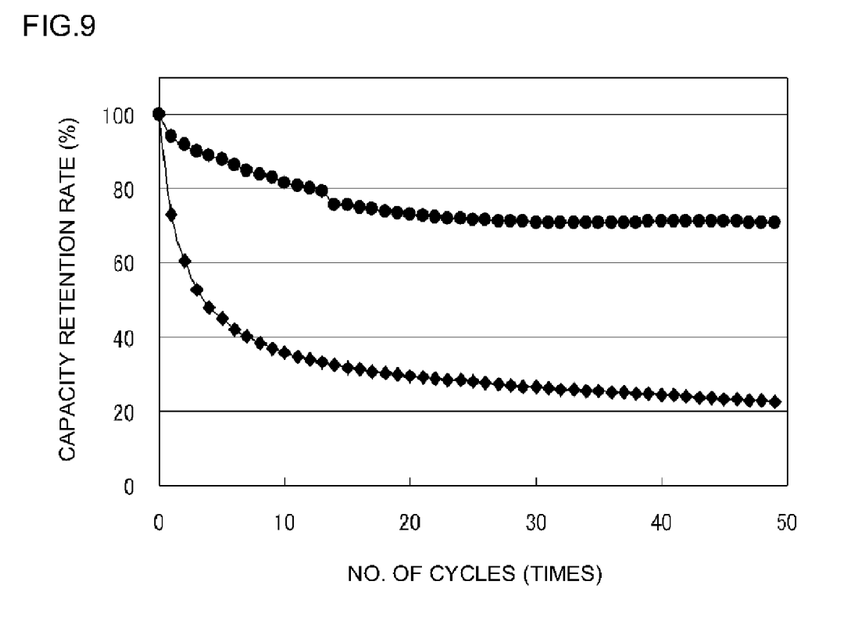
FIG. 9 is a graph indicating changes in capacity retention rates during electrode cycle testing according to Examples 1 and 3.

With respect to the coin cells according to Examples 1 and 3, absorption and desorption of Li were alternately carried out between inter-electrode voltages of 0.01 V to 3.0 V and at a constant current of 0.2 C following the initial charging and discharging until the total number of charge-discharge cycles, including the initial charging and discharging, reached 50 cycles. Capacity retention rate was then determined by dividing the Li absorption (discharge) capacity in each cycle by the initial Li absorption capacity. Those results are shown in FIG. 9 and Table 2.

TABLE 2

| | Initial (mAh/g) | 50th cycle (mAh/g) | Capacity retention rate (%) |
|---|---|---|---|
| Example 1 | 967 | 686 | 70.9 |
| Example 3 | 1053 | 238 | 22.6 |

As shown in FIG. 8 and Table 1, although capacity nearly equivalent to the theoretical capacity of $Fe_2O_3$ (1008 mAh/g) was obtained for initial Li absorption capacity with the electrode according to Example 3 that used $Fe_2O_3$ powder, similar to the trend typically observed with conventional iron oxide-based electrodes, irreversible capacity was extremely large. In addition, the decrease in voltage when charging was cut off at 3 V (namely, the overvoltage component) was large (FIG. 8), and speed of the battery reaction can be seen to be somewhat lacking. Moreover, as shown in FIG. 9, in the electrode according to Example 3, capacity decreased suddenly accompanying repeated charging and discharge, and the capacity retention rate thereof decreased to less than 40% prior to reaching 10 cycles.

In the electrode according to Example 2, although the capacity per se during initial charging and discharging was low as shown in FIG. 7 and Table 1, the initial charge-discharge efficiency improved considerably in comparison with Example 3. Reduction of film thickness of the iron oxide film and radiation of an oxygen ion beam during thin film formation were presumed to have contributed to this result.

In the electrode according to Example 1, as shown in FIG. 6 and Table 1, capacity was obtained that nearly equivalent to the theoretical capacity of $Fe_2O_3$ in the same manner as Example 3 with respect to initial Li absorption capacity. Moreover, 90% or higher efficiency was exhibited during initial charging and discharging, thereby realizing considerably higher charge-discharge efficiency than Example 3. In addition, the voltage decrease when charging was cut off was clearly smaller than that of Example 3 (FIG. 6), and the speed of the battery reaction was suggested to be superior. In addition, as shown in FIG. 9, the decrease in capacity attributable to repeated charging and discharging in the electrode according to Example 1 improved considerably in comparison with that of Example 3. More specifically, the capacity retention rate after 10 cycles was 80% or more, while that after 50 cycles was still 70% or more, thereby realizing a high level of durability.

<Observation of Surface Morphology>

Figure 1:
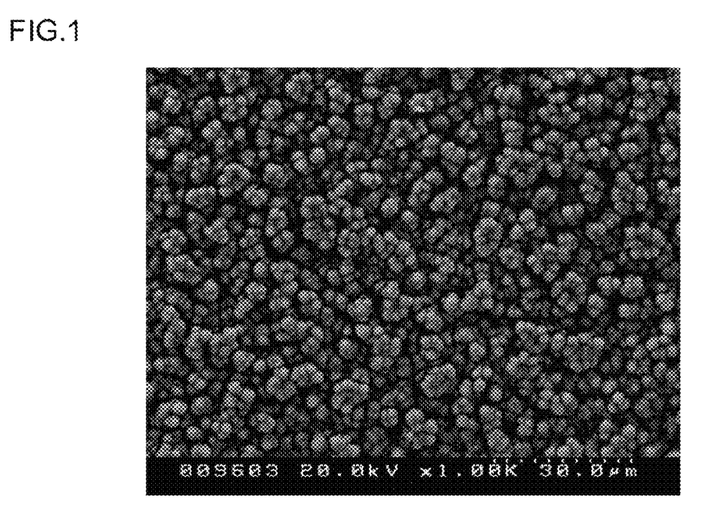
FIG. 1 is an SEM micrograph of an electrode according to Example 1.
Figure 2:
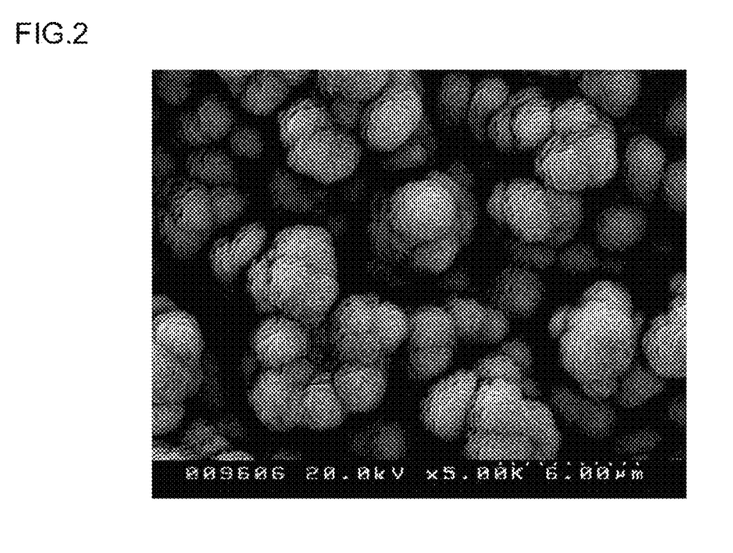
FIG. 2 is an SEM micrograph taken at a higher magnification of an electrode according to Example 1.

The surface of the electrode produced in Example 1 provided with an active material film was observed with a scanning electron microscope (SEM). The resulting SEM micrographs are shown in FIGS. 1 and 2 (FIG. 2 depicts a higher magnification than that of FIG. 1). As can be understood from these SEM micrographs, an iron oxide film is formed that follows the surface morphology of the electrodeposited surface of the electrolytic copper foil in this electrode, and as a result thereof, the surface on the side of the active material has an irregular morphology that generally reflects the surface morphology of the electrodeposited surface.

Figure 3:
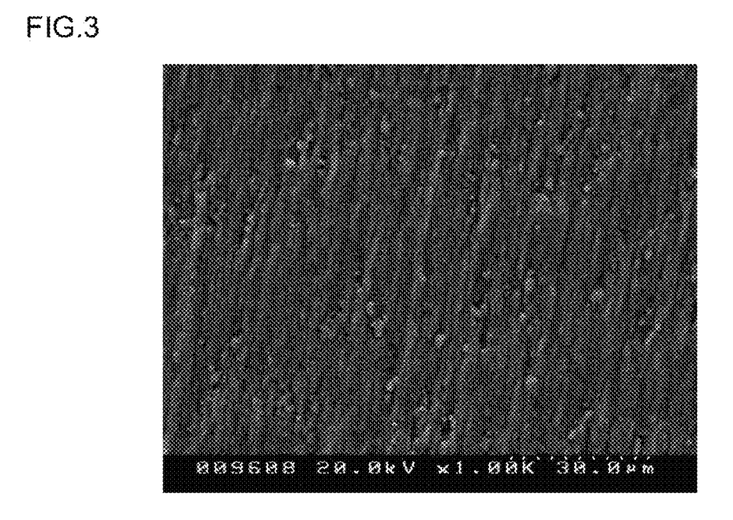
FIG. 3 is an SEM micrograph of an electrode according to Example 2.
Figure 4:
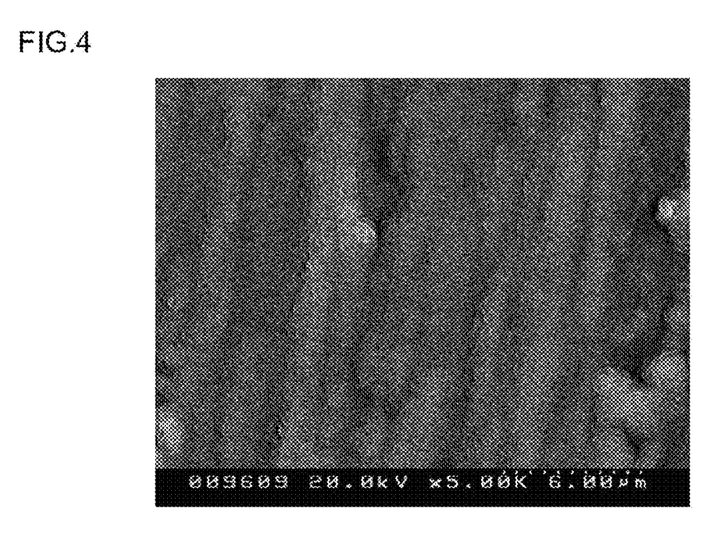
FIG. 4 is an SEM micrograph taken at a high magnification of an electrode according to Example 2.

Micrographs obtained by observing the surface of the electrode produced in Example 2 (side on which active material film is provided) with an SEM are shown in FIGS. 3 and 4 (FIG. 4 depicts a higher magnification than that of FIG. 3). Since the morphology of the vapor-deposited surface of the electrode according to Example 2 is smooth, an irregular morphology like that of Example 1 can be seen to not be formed on the electrode surface.

<X-Ray Diffraction Data>

Figure 5:
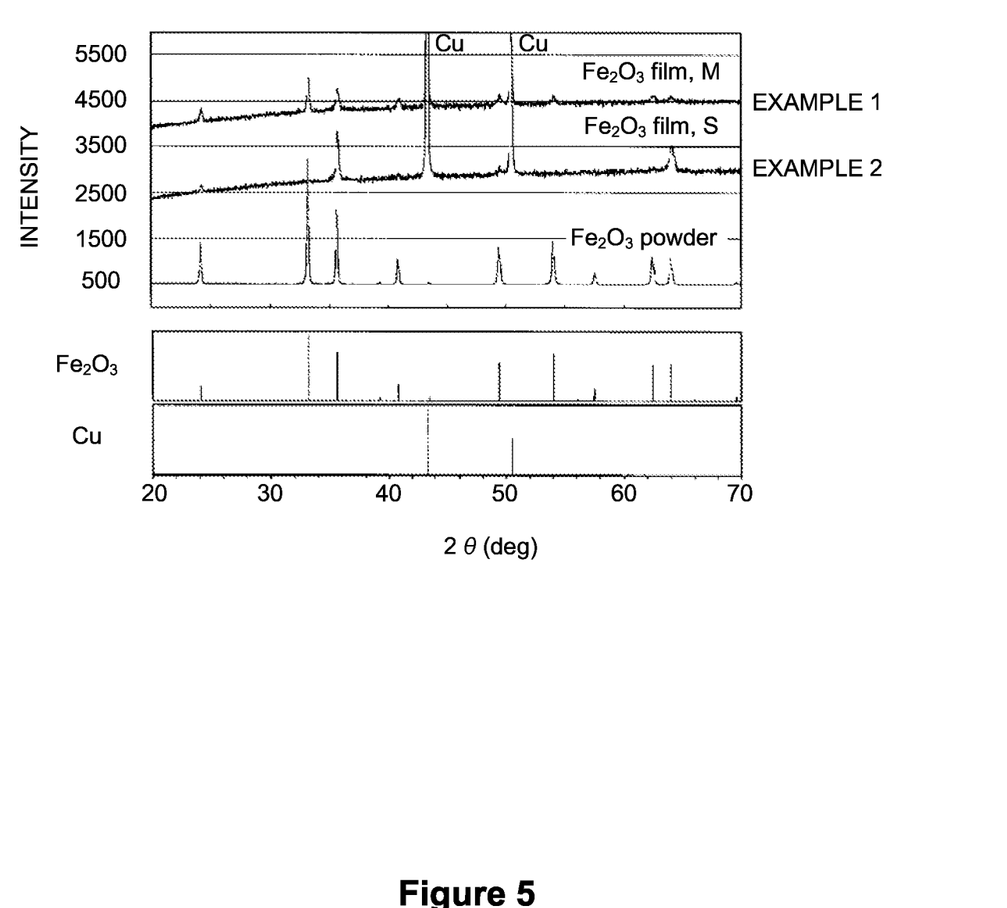
FIG. 5 is a characteristics chart showing a comparison of the XRD spectra of iron oxide films according to Examples 1 and 2 and the XRD spectrum of a commercially available $Fe_2O_3$ powder with X-ray diffraction patterns of $Fe_2O_3$ and Cu.

The results of measuring X-ray diffraction of the iron oxide films produced according to Examples 1 and 2 are shown in FIG. 5. The uppermost plot of FIG. 5 shows the XRD spectrum for the iron oxide film according to Example 1, while the second plot from the top shows the XRD spectrum for the iron oxide film according to Example 2. The third plot in FIG. 5 shows the results of measuring X-ray diffraction of commercially available $Fe_2O_3$ powder ($\alpha$-$Fe_2O_3$ (hematite) structure). The lower plots of FIG. 5 show the X-ray diffraction patterns of $Fe_2O_3$ and Cu (JCPDS cards).

As can be understood from FIG. 5, more diffraction peaks attributable to $\alpha$-$Fe_2O_3$ are observed in Example 1 as compared with Example 2. On the basis of this result, the iron oxide film of Example 1 formed on a roughened surface of an electrolytic copper foil was confirmed to exhibit greater $\alpha$-$Fe_2O_3$ crystal growth than Example 2.

Although the above has provided a detailed explanation of specific examples of the present invention, these examples are merely intended to be exemplary, and do not limit the scope of claims for patent. Various alterations and modifications of the specific examples indicated above are included in the technology described in the scope of claims for patent.

INDUSTRIAL APPLICABILITY

Figure 12:
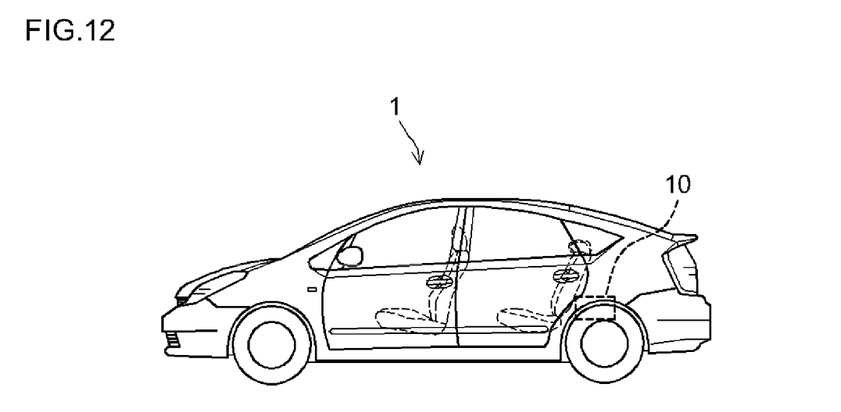
FIG. 12 is a side view schematically showing a vehicle (automobile) provided with a lithium secondary battery.

Since the lithium secondary battery (and typically, a lithium ion battery) provided according to the technology disclosed herein demonstrates superior performance (such as charge-discharge reversibility) as previously described, it can be used as a lithium secondary battery for various types of applications. For example, it can be preferably used as a power source for the motor installed in a vehicle such as an automobile. The lithium secondary battery may be used in the form of an assembled battery in which a plurality of the lithium secondary batteries are connected in series and/or in parallel. Thus, according to the technology disclosed herein, as schematically shown in FIG. 12, a vehicle (typically an automobile, and particularly an automobile provided with an electric motor in the manner of a hybrid vehicle, electric vehicle or fuel cell vehicle) 1 can be provided that is provided the lithium ion battery (which can be in the form of an assembled battery) 10 as a power source thereof.

The invention claimed is:

1. A lithium secondary battery comprising a positive electrode, a negative electrode and a non-aqueous electrolyte, wherein
    one of the positive electrode and the negative electrode is an iron oxide film-coated electrode employing a configuration in which an iron oxide film capable of reversibly absorbing and desorbing lithium is retained on an electrically conductive base,
    the base has a roughened surface having a surface roughness Rz of 3 μm or more, and the iron oxide film is provided on the roughened surface, and
    the iron oxide film contains $\alpha$-$Fe_2O_3$ crystals, and the thickness TA of the iron oxide film is 0.1 μm to 30 μm.

2. The battery according to claim 1, wherein the iron oxide film is obtained by depositing an iron oxide on the roughened surface by physical vapor deposition or chemical vapor deposition.

3. The battery according to claim 1, wherein the thickness TA of the iron oxide film is 5 μm or less and is smaller than the Rz value of the roughened surface.

4. The battery according to claim 1, wherein the base is an electrolytic copper foil and the iron oxide film is provided on at least an electrodeposited surface of the copper foil.

5. The battery according to claim 1, wherein the iron oxide film-coated electrode is provided as a negative electrode.

6. A method of producing an electrode for a lithium secondary battery,
    the method comprising:
    preparing an electrically conductive base having a roughened surface in which surface roughness Rz is 3 μm or more; and
    forming an iron oxide film by depositing an iron oxide on the roughened surface of the base, wherein the iron oxide film contains $\alpha$-$Fe_2O_3$ crystals, and the thickness TA of the iron oxide film is 0.1 μm to 30 μm.

7. The method according to claim 6, wherein the deposition of the iron oxide is carried out by physical vapor deposition or chemical vapor deposition.

8. A method of producing a lithium secondary battery,
    the method comprising: constructing a battery comprising an electrode produced according to the method according to claim 6.

* * * * *